(12) United States Patent
Yamamoto et al.

(10) Patent No.: US 6,453,150 B1
(45) Date of Patent: Sep. 17, 2002

(54) MAXIMUM-RATIO SYNTHETIC TRANSMISSION DIVERSITY DEVICE

(75) Inventors: Kazuhiro Yamamoto, Kanagawa (JP); Muneo Iida, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 09/085,489

(22) Filed: May 27, 1998

(30) Foreign Application Priority Data

May 30, 1997 (JP) .............................................. 9-158038

(51) Int. Cl.[7] .............................................. H04B 7/185
(52) U.S. Cl. ..................... 455/13.3; 455/13.4; 455/12.1; 455/13.2; 455/25; 342/352; 342/354
(58) Field of Search .......................... 455/277.1, 277.2, 455/272, 273, 276.1, 278.1, 279.1, 561, 562, 13.4, 13.3, 20, 33.4, 54.1, 12.1, 33.1, 33.3, 25; 342/352, 354, 368, 372, 371, 373; 343/100, 854

(56) References Cited

U.S. PATENT DOCUMENTS

| | | | |
|---|---|---|---|
| 4,166,274 A | * 8/1979 | Reudink et al. | 342/376 |
| 4,217,587 A | * 8/1980 | Jacomini | 342/372 |
| 4,314,250 A | * 2/1982 | Hanell et al. | 343/100 |
| 4,686,533 A | * 8/1987 | MacDonald et al. | 342/373 |
| 5,239,541 A | * 8/1993 | Murai | 370/77 |
| 5,283,587 A | * 2/1994 | Hirshfield et al. | 342/372 |
| 5,559,795 A | * 9/1996 | Ahl | 370/342 |
| 5,594,941 A | * 1/1997 | Dent | 455/13.4 |
| 5,684,793 A | * 11/1997 | Kiema et al. | 370/335 |
| 5,778,324 A | * 7/1998 | Smith | 455/562 |
| 5,815,116 A | * 9/1998 | Dunbridge et al. | 342/373 |
| 5,894,598 A | * 4/1999 | Shoki | 455/562 |
| 5,909,641 A | * 6/1999 | Simmons | 455/78 |
| 5,959,579 A | * 9/1999 | Ghadh | 342/375 |
| 5,977,910 A | * 11/1999 | Matthews | 342/368 |
| 6,122,260 A | * 9/2000 | Liu et al. | 370/280 |

* cited by examiner

Primary Examiner—Daniel Hunter
Assistant Examiner—Pablo Tran
(74) Attorney, Agent, or Firm—Joel Lutzker; Donna L. Angotti; Schulte Roth & Zabel LLP

(57) ABSTRACT

Antenna elements 20 are arranged at intervals "d" greater than $\lambda/2$, e.g., $5\lambda$. A signal received by an antenna element 20 is sent by way of an antenna multiplexer 21 to a receiver 23, where the signal is demodulated. The thus-demodulated signal is sent to a phase-and-power detection section 25, where a phase and power of the signal are detected. On the basis of the result of such detection, a control section 26 calculates the phase and power of a transmission signal. On the basis of the result of the calculation, a transmission signal generation circuit 27 transmits a transmission signal to each of the antenna elements 20 by way of the antenna multiplexer 21.

16 Claims, 10 Drawing Sheets

ANTENNA INTERVAL=0.4λ
NUMBER OF ANTENNAS=4

ANTENNA INTERVAL=4λ
NUMBER OF ANTENNAS=4

TDMA/TDD

MAXIMUM-RATIO SYNTHETIC TRANSMISSION DIVERSITY DEVICE

BACKGROUND OF THE INVENTION

The present invention relates to a maximum-ratio synthetic transmission diversity device suitable for use in mobile communications, such as communications carried out by a personal handy-phone system (PHS).

An array antenna is one type of conventional transmission antenna and comprises phased-array antennas, adaptive-array antennas, or the like. Another type of conventional transmission antenna is an antenna selection diversity antenna. The phased-array antenna usually has a configuration such as that shown in FIG. 8.

In the drawing, reference numeral 1 designates a plurality of antenna elements; 2 designates a phase shifter; 3 designates an antenna multiplexer (or switch); 4 designates a receiver; 5 designates a transmitter; and 6 designates a control section. The phase shifter 2 has the function of controlling the phase of a transmission signal and is provided for a power feeding section of each antenna element 1. The control section 6 controls the phase shifters 2.

The phase of a signal to be transmitted to each antenna element 1 is adjusted by the control section 6 controlling each phase shifter 2 so as to synthesize the phases of the transmission signals in space, thus forming a wave beam 7 in a predetermined direction and improving the gain of the antenna.

In such a case, there exists a need to arrange the antenna elements 1 at intervals of $\lambda/2$ ($\lambda$ is a wavelength of a wave to be used) or less. Taking the number of antenna elements 1 as N, the gain of the antenna in the predetermined direction can be improved by a factor of N.

As mentioned above, although the wave beam formed by the phased-array antenna can be adaptively controlled depending on a change in a wave environment, the wave beam is not widely utilized, because of its inherent problems, such as the length of an adaptive time or the accuracy of the phase shifter.

To eliminate these drawbacks in the conventional phased-array antenna, an adaptive array technique has already been developed. FIG. 9 shows an exemplary configuration of a conventional adaptive array antenna. In the drawing, reference numeral 10 designates a plurality of antenna elements; 11 designates an antenna multiplexer; 12 designates a transmitter; 13 designates a receiver; 14 designates a digital signal processing section; 15 designates a phase-and-power detection section; 16 designates a transmission signal generation circuit; and 17 designates a control section.

As shown in FIG. 9, the adaptive array antenna also comprises the plurality of antennas 10 arranged at intervals "d" equal to or less than $\lambda/2$, as in the case of the phased-array antenna. A signal received by each antenna element 10 is demodulated by the receiver 13, and the control section 17 calculates the phase and power of the transmission signal on the basis of the phase and power of the signal detected from the demodulated signal by the phase-and-power detection section 15. Depending on the thus-calculated phase and power of the transmission signal, the transmitter 12 demodulates a transmission signal generated by the transmission signal generation circuit 16. The thus-demodulated signals are fed to the antenna elements 10, so that the transmission signal is synthesized in space. This adaptive array technique solves the inherent drawbacks of the phased-array antenna, such as the length of an adaptive time or the accuracy of phase control.

In order to reduce an inter-antenna correlation coefficient, the antenna selective diversity device comprises a plurality of antenna elements arranged at intervals of $\lambda/2$ or more and adopts a method of selecting an antenna element to be used for transmission on the basis of the level of the power received by the plurality of antenna elements or the like. A relationship between the correlation coefficient and the interval among the antenna elements assumes a curve such as that plotted in FIG. 10. In a case where the antenna elements are arranged at intervals of $\lambda/2$ or more, the correlation coefficient among the antenna elements can be reduced. However, in such a case, since the individual antenna elements are susceptible to a varying fading phenomenon, the influence of the fading phenomenon on the antenna elements can be diminished by selection of the antenna elements in a manner as shown in FIG. 11. In FIG. 11, the horizontal axis represents time and the vertical axis represents a receiving level of each antenna element.

The conventional transmission antennas mentioned previously suffer the following problems:

First, the phased-array antenna is intended to form a wave beam in a predetermined direction, and hence the antenna elements must be arranged at intervals of $\lambda/2$ or less. Because of such a configuration, there is a high correlation coefficient among the antenna elements, and the antenna elements are subjected to the influence of a fading phenomenon, thus deteriorating the characteristics of the phased-array antenna.

The antenna selective diversity device employs a method of transmitting a signal by selection of one antenna element from a plurality of antenna elements on the basis of the power of signals received by the antenna elements. When compared with the gain of the array antenna obtained through synthesis of phases, there is a slight improvement in the receive power of a mobile terminal (i.e., an improvement in the gain of the antenna). Particularly, in a fading-free environment of superior visibility, there is no improvement in the receive power of the terminal.

SUMMARY OF THE INVENTION

The object of the present invention is to overcome the foregoing drawbacks of the conventional array antennas and those of the conventional antenna selection diversity devices mentioned previously, as well as to provide a maximum-ratio synthetic transmission diversity device which permits an improvement in an antenna gain of an array antenna and accomplishment of a space diversity effect stemming from a reduction in the correlation among antenna elements.

To accomplish the foregoing object, a maximum-ratio synthetic transmission diversity device, according to the present invention, comprises a plurality of antenna elements which are arranged intervals greater than $\lambda/2$ (where $\lambda$ represents the wavelength of a wave to be used); a plurality of transmitters and receivers provided so as to correspond to the respective antenna elements; antenna multiplexing means for selectively connecting the antenna elements with one of the receivers and transmitters, respectively; and signal processing means which detects the phase of the signal received by each of the receivers and sends a transmission signal having a phase corresponding to the result of such detection to each of the transmitters, where the transmission signal is transmitted by way of each of the antenna elements.

A personal handy-phone system, according to the present invention, uses a maximum-ratio synthetic transmission diversity device as a base station, the diversity device comprising a plurality of antenna elements which are arranged intervals greater than λ/2 (where λ represents the wavelength of a wave to be used); a plurality of transmitters and receivers provided so as to correspond to the respective antenna elements; antenna multiplexing means for selectively connecting the antenna elements with one of the receivers and transmitters, respectively; and signal processing means which detects the phase of the signal received by each of the receivers and sends a transmission signal having a phase corresponding to the result of such detection to each of the transmitters, where the transmission signal is transmitted by way of each of the antenna elements.

In each of the foregoing inventions, in addition to the phase of the signal, the power of the received signal may be detected, and a transmission signal having a phase and power corresponding to the result of such detection may be sent to each of the transmitters, where the transmission signal is transmitted by way of each of the antenna elements.

DETAILED DESCRIPTION OF THE PREFERRED EMBODIMENTS

Figure 1:
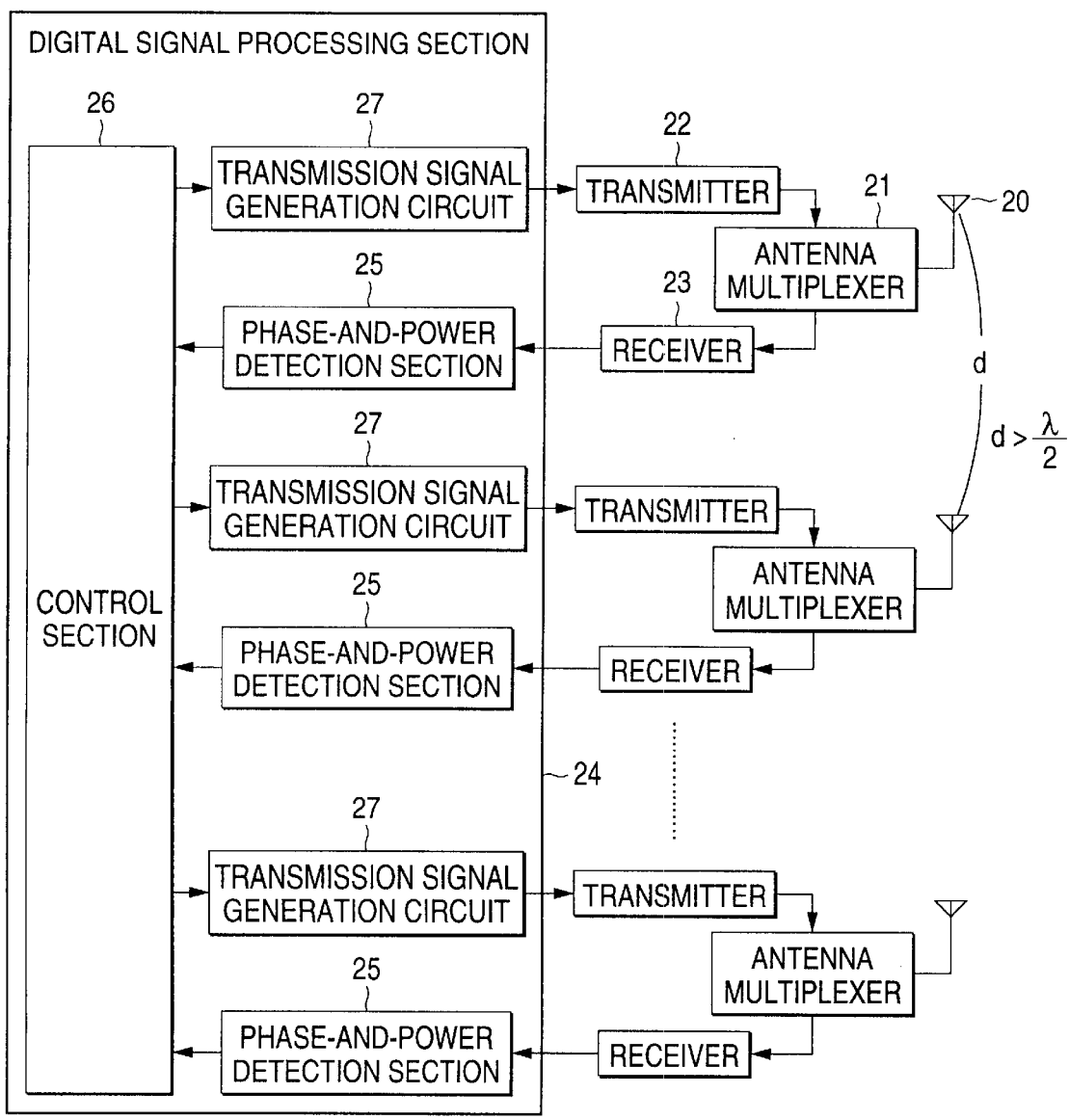
FIG. 1 is a block diagram showing an embodiment for carrying out the present invention.

In an embodiment for carrying out the present invention, for example, a plurality of antenna elements 20 are arranged at intervals greater than λ/2 in a manner such as that shown in FIG. 1. Reference numeral 21 designates an antenna multiplexer (or a switch) used for causing a transmitter 22 and a receiver 23 to selectively share the antenna element 20. A received signal is sent to the receiver 23, where the signal is demodulated. The thus-demodulated signal is sent to a phase-and-power detection section 25 provided within a digital signal processing section 24, where the power and phase of the received signal are detected. On the basis of the result of such detection, a control section 26 calculates the phase and power of a transmission signal and sends the calculation result to a transmission signal generation circuit 27. The transmission signal generation circuit 27 produces a transmission signal having a phase and power equivalent to those calculated by the control section. The transmission signal is then modulated by the transmitter 22, and the modulated signal is transmitted from each antenna element 20 via the antenna multiplexer 21.

In the device according to the present invention shown in FIG. 1, as a result of the antenna elements being arranged at intervals greater than λ/2, the device is characterized by the antenna gain stemming from phase synthesis which characterizes the array antenna, as well as by the space diversity gain of the antenna selection diversity device.

Figure 2A:
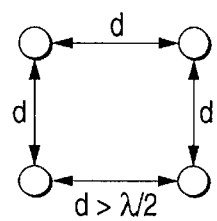
FIGS. 2A and 2B are schematic representations showing exemplary layouts of antenna elements according to the present invention.
Figure 2B:
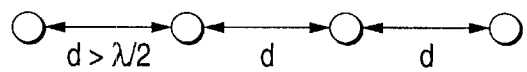
Figure 3:
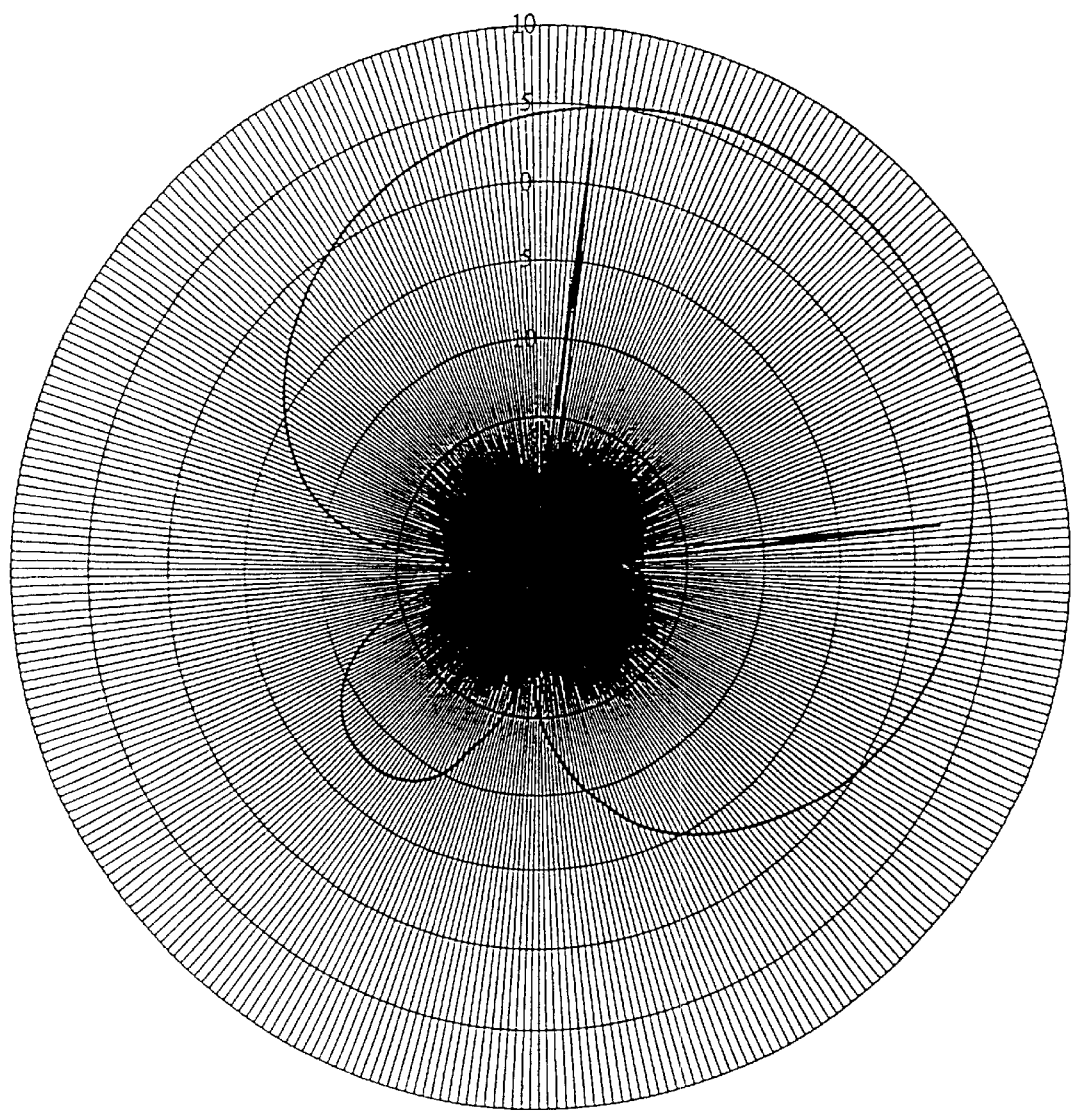
FIG. 3 is a chart showing one example of a radiation pattern of an antenna element of a conventional transmission antenna device.

The antenna elements 20 are arranged in, e.g., layouts such as those shown in FIGS. 2A and 2B. FIG. 3 shows one example of an antenna radiation pattern with regard to a conventional antenna selection diversity device having four antenna elements arranged at intervals "d" of λ/2 or less.

Figure 4:
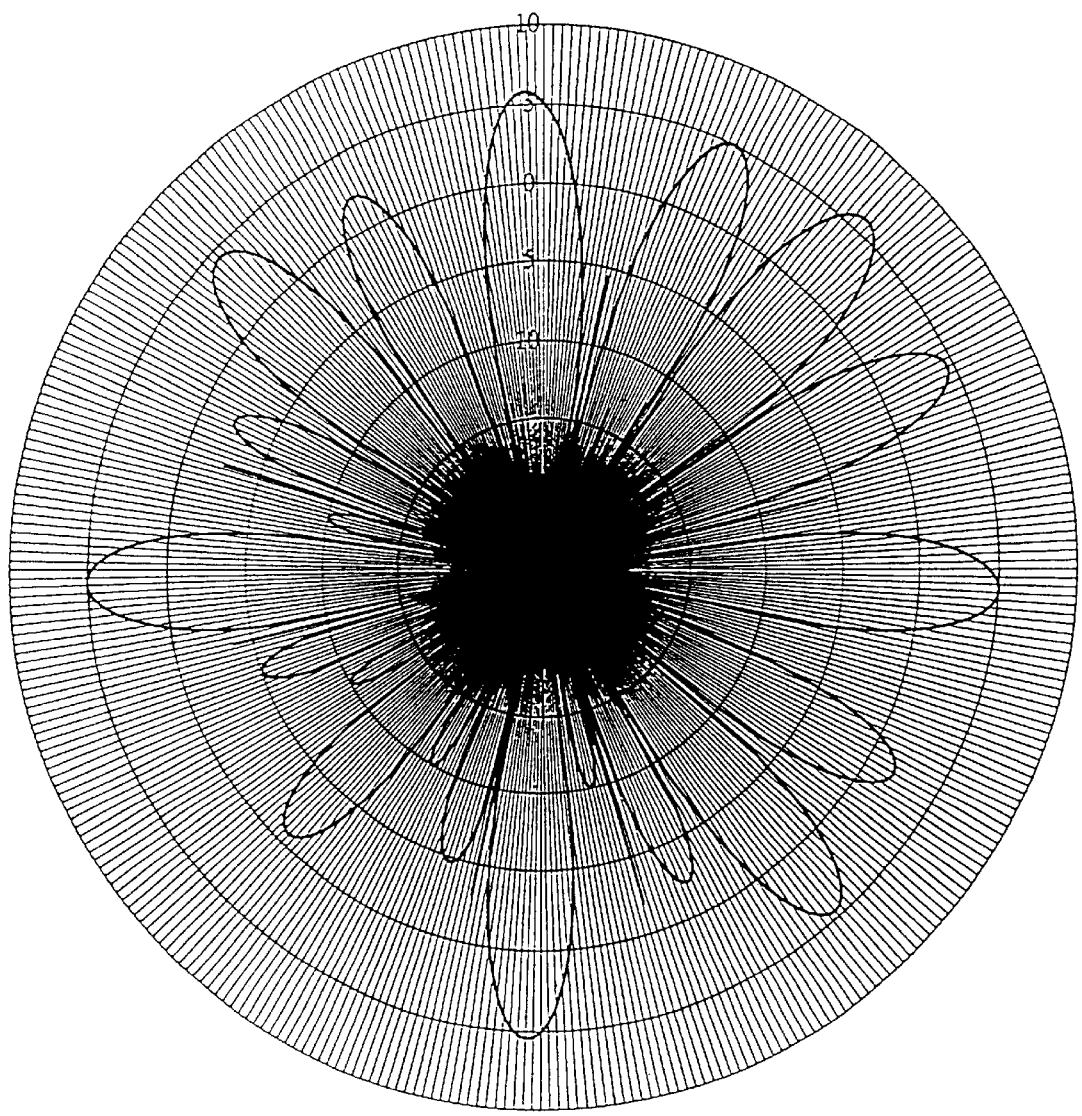
FIG. 4 is a chart showing one example of a radiation pattern of an antenna element according to the present invention.

FIG. 4 shows one example of an antenna radiation pattern with regard to the foregoing device according to the present invention having antenna elements arranged at intervals of λ/2 or more. As is obvious from FIG. 4, in a case where antenna elements are arranged at intervals greater than λ/2 in a manner analogous to that employed by the present invention, a wave radiation beam assigned directivity in a predetermined direction is not formed, but there is formed a radiation pattern having a plurality of substantially equal peaks in every direction (or through 360°). Therefore, the antenna becomes omnidirectional. Further, the gain of such an antenna is the same as that of an antenna having antenna elements arranged at intervals of λ/2 or less.

Figure 5:
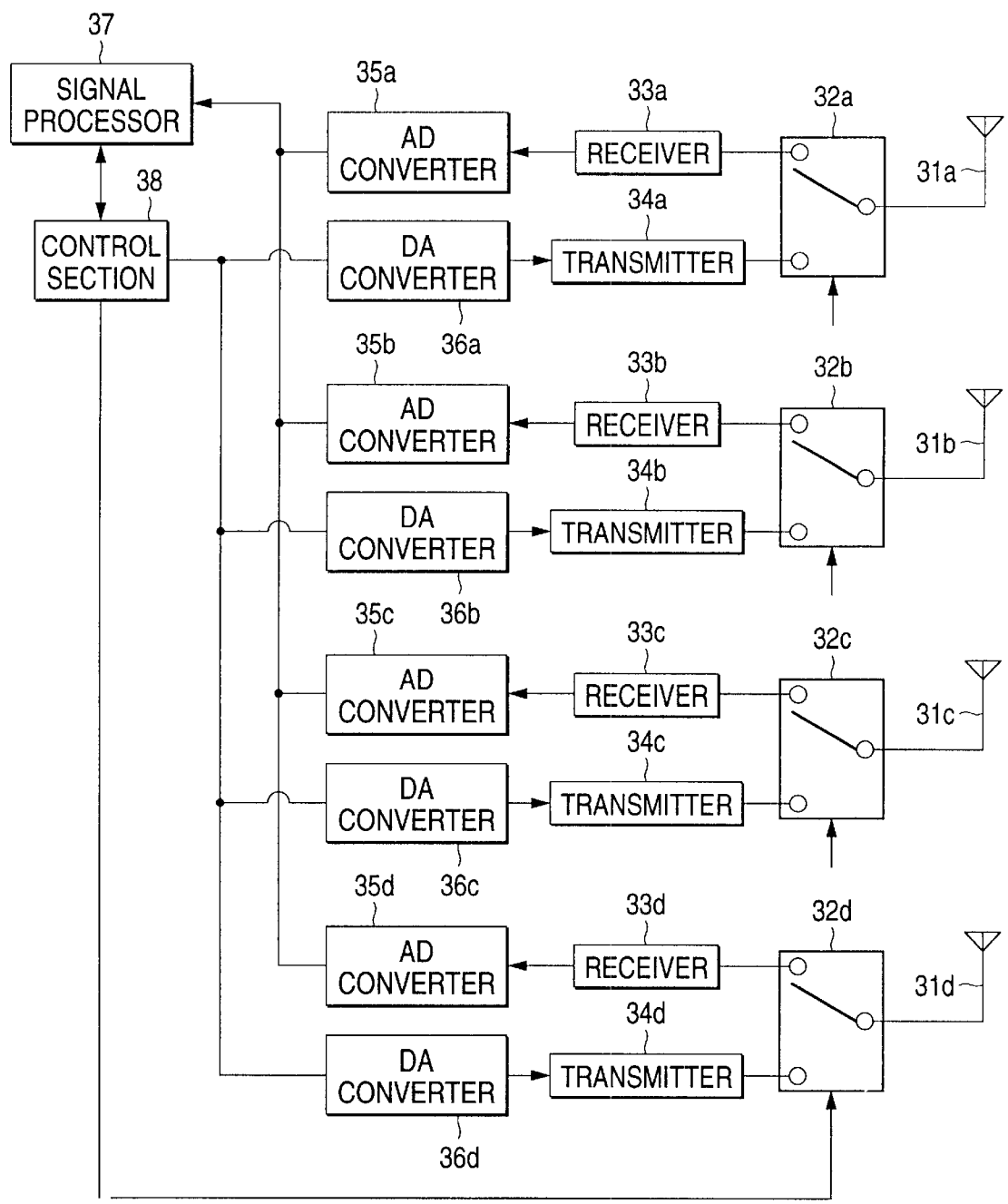
FIG. 5 is a block diagram showing an embodiment of the present invention.

FIG. 5 shows an embodiment of a maximum-ratio synthetic transmission diversity device according to the present invention. In the drawing, reference numerals 31a to 31d designate antenna elements used for both transmission and receiving purposes. The antenna elements are arranged at intervals "d" greater than λ/2, e.g., 5λ.

Reference numerals 33a through 33d designate receivers, and 34a and 34b designate transmitters. The receivers and transmitters are connected to antenna elements 31a through 31d by way of antenna multiplexers (or switches) 32a through 32d, respectively. Reference numerals 35a through 35d designate analog-to-digital converters; 36a through 36d designate digital-to-analog converters; 37 designates a signal processor; and 38 designates a control section. A phase-and-power detection section is provided within each signal processor 37 for detecting a received phase and power detected for each antenna channel. Outputs from the receivers 33a through 33d are converted into digital signals by means of the analog-to-digital converters 35a through 35d. The thus-converted digital signals are fed to the signal processor 37a. In contrast, a digital transmission signal output from the control section 38 is converted into an analog signal by means of the digital-to-analog converters 36a through 36d, and the thus-converted analog signal is delivered to the transmitters 34a through 34d.

Although in the present embodiment four antenna channels "a" to "d" are provided for the diversity device, the operation of only one channel "a" of the antenna channels will be described. Since the other channels "b" to "d"

operate in the same manner, explanations of their operations will be omitted here.

A signal received by the antenna element 31a is sent to the receiver 33a by way of the antenna multiplexer 32a controlled by the control section 38. The receiver 33a demodulates the received signal, and the analog-to-digital converter 34a converts the demodulated signal into a digital signal. The digital signal is sent to the signal processor section 37.

The signal processor 37 detects the relative phase and power of the signal received by each of the antenna elements 31a to 31d. On the basis of such detection, for each antenna element the signal processor section 37 calculates the relative phase and power of a transmission signal which are optimum for transmission. Data regarding the relative phase and power are sent to the control section 28.

The control section 38 produces a transmission signal on the basis of calculated data and a weighting coefficient of each antenna element and sends the thus-produced transmission signal to a digital-to-analog converter 36a, where the transmission signal is converted into an analog signal. The analog signal is then modulated by the transmitter 34a, and the thus-modulated signal is sent to the antenna element 31a by way of the antenna multiplexer 32a.

Through execution of the foregoing operations for each antenna element, the diversity device can achieve both the antenna gain characterizing the phased-array antenna and the space diversity characteristics.

Figure 6:
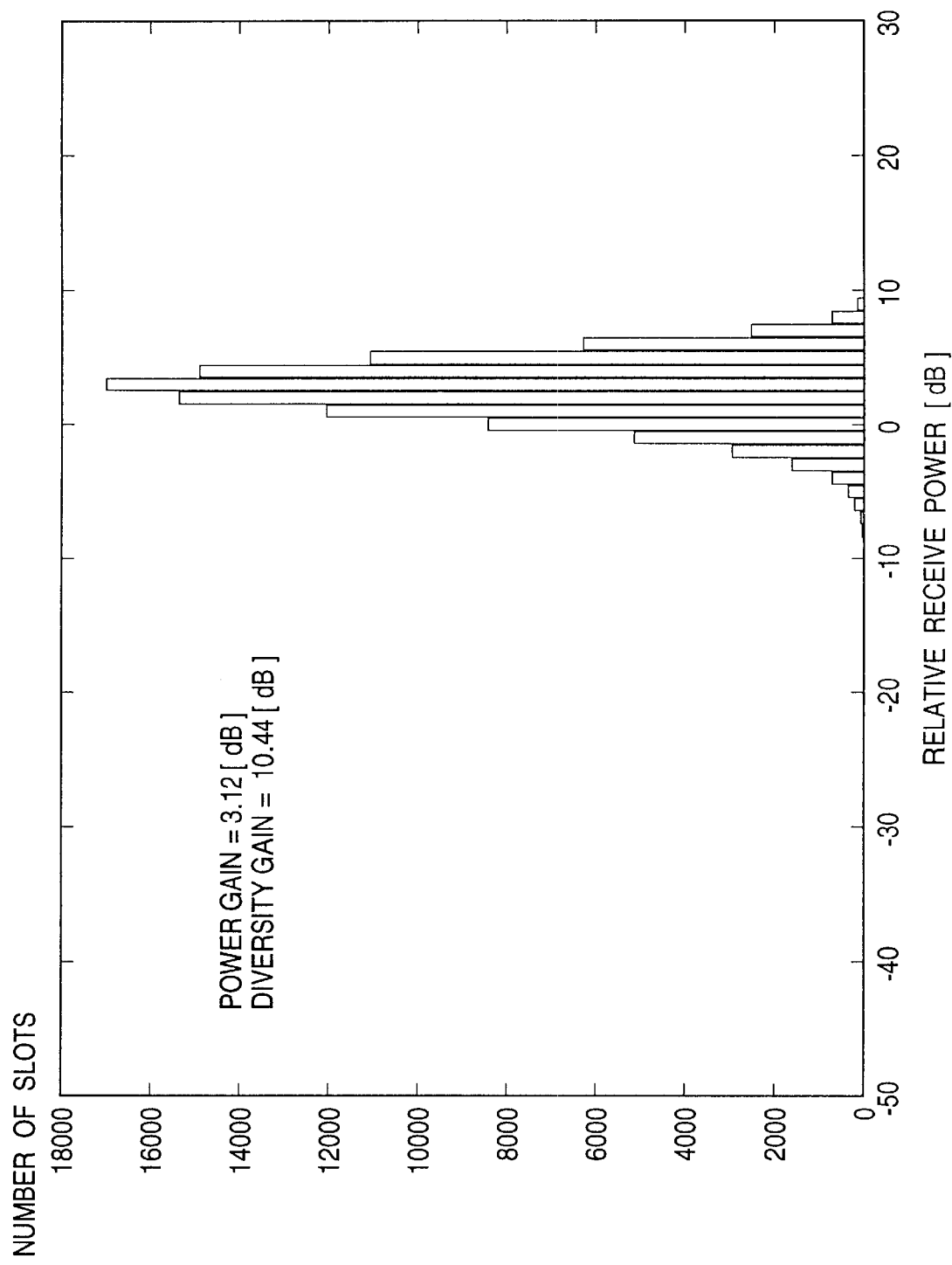
FIG. 6 is a graph which is plotted through computational simulation and shows antenna and diversity gains of a conventional space diversity antenna.
Figure 7:
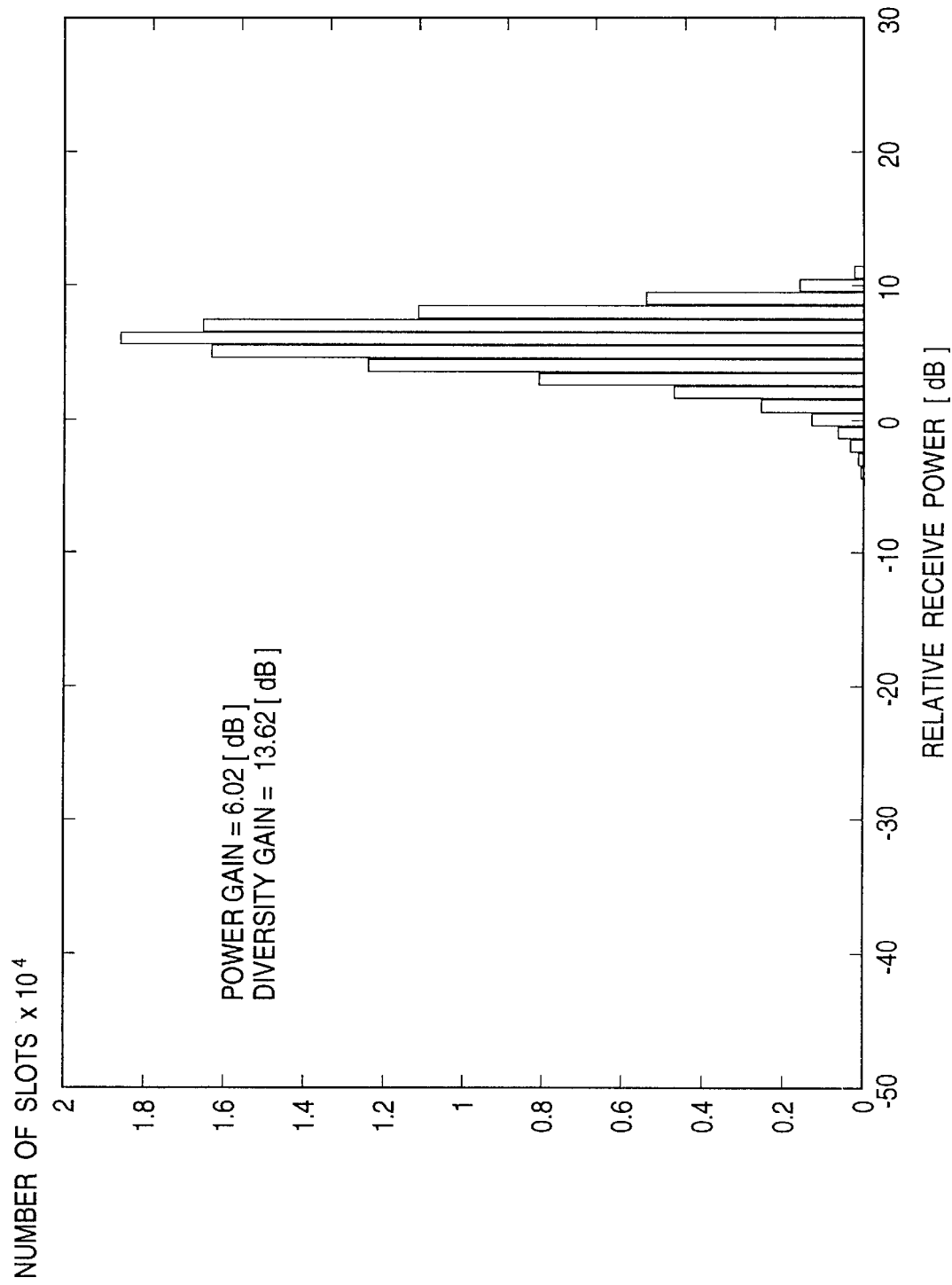
FIG. 7 is a graph which is plotted through computational simulation and shows antenna and diversity gains of the antenna element according to the present invention.
Figure 8:
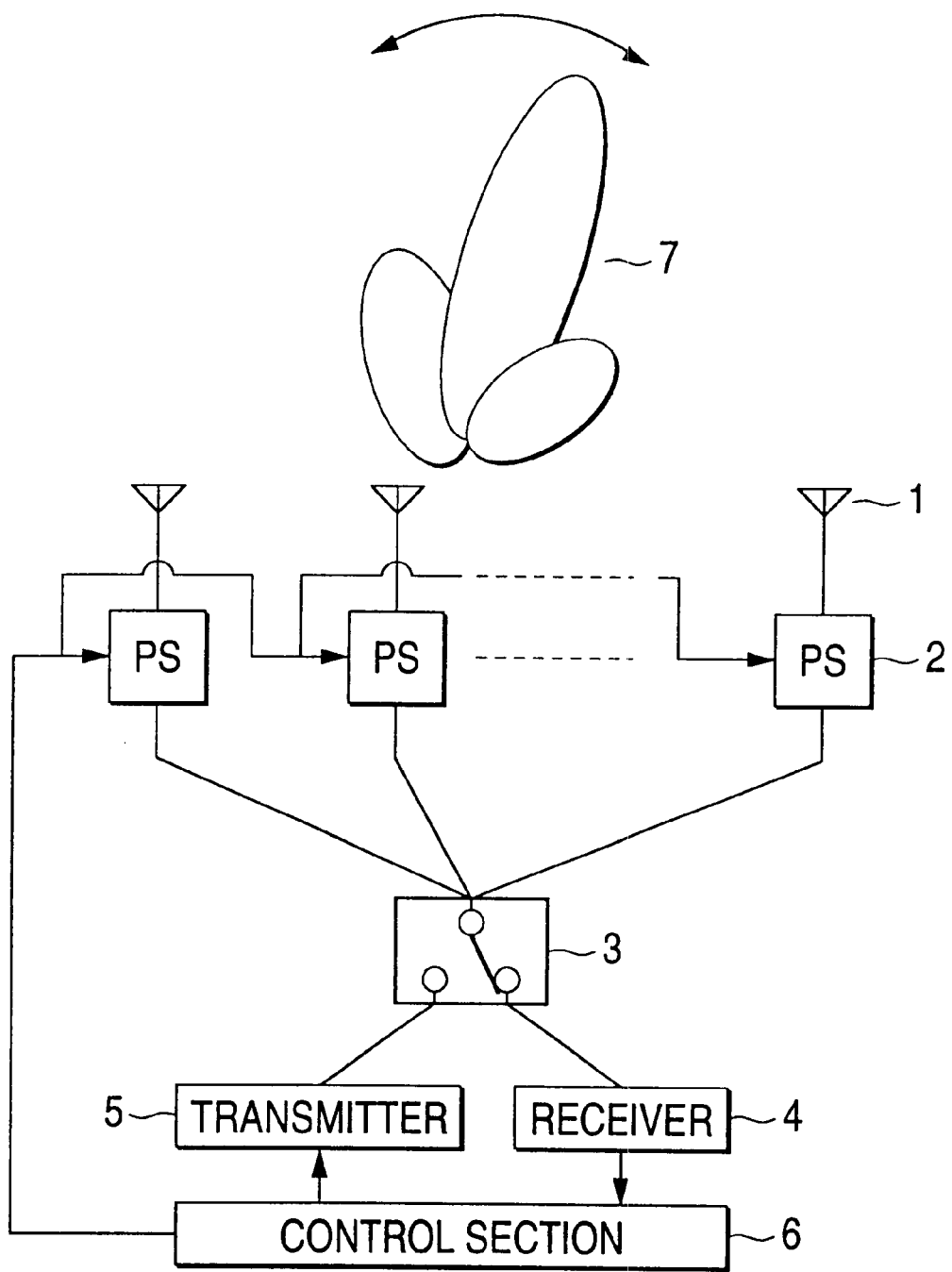
FIG. 8 is a block diagram showing the configuration of a conventional phased-array antenna.
Figure 9:
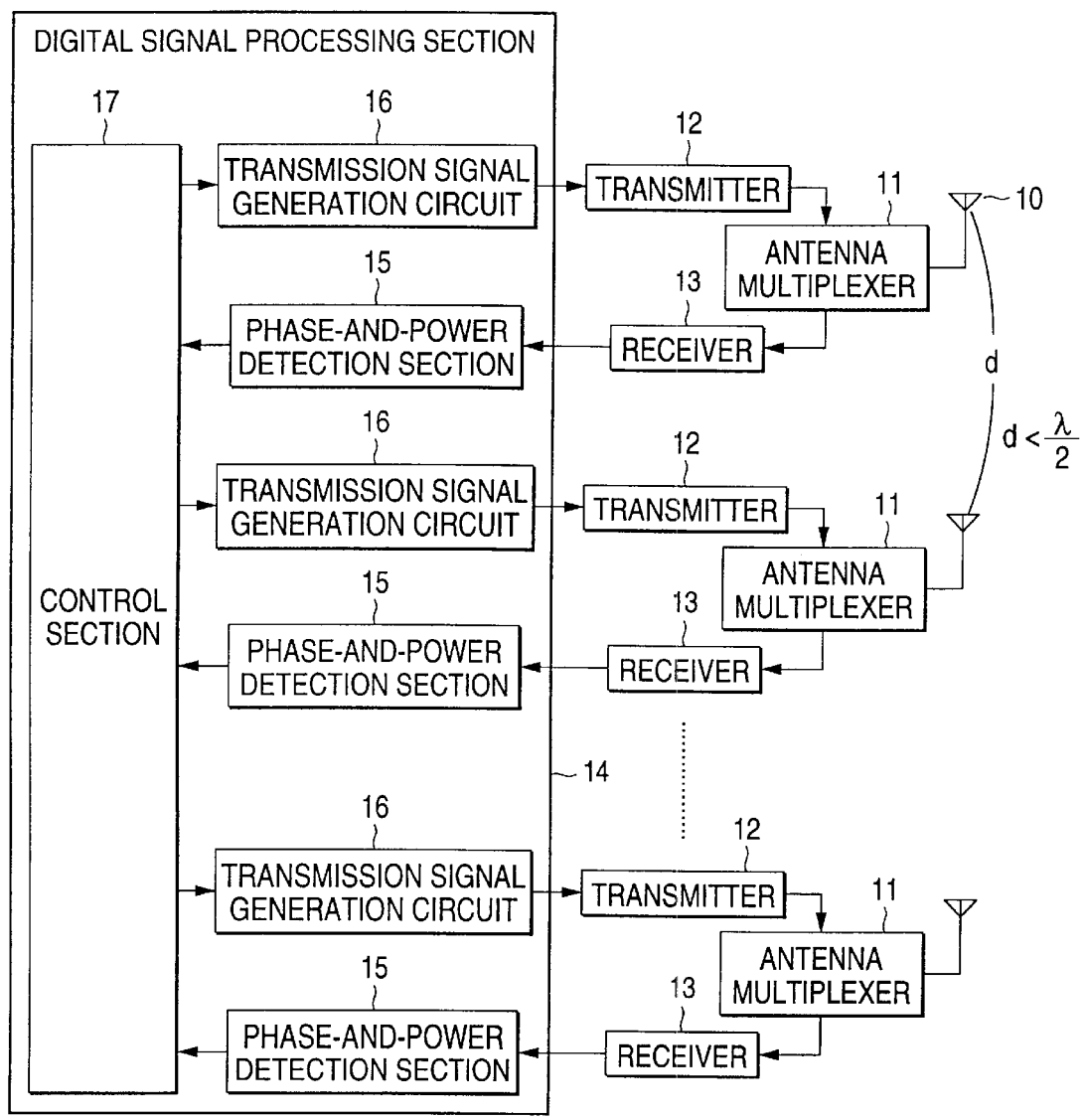
FIG. 9 is a block diagram showing the configuration of a conventional adaptive array antenna.
Figure 10:
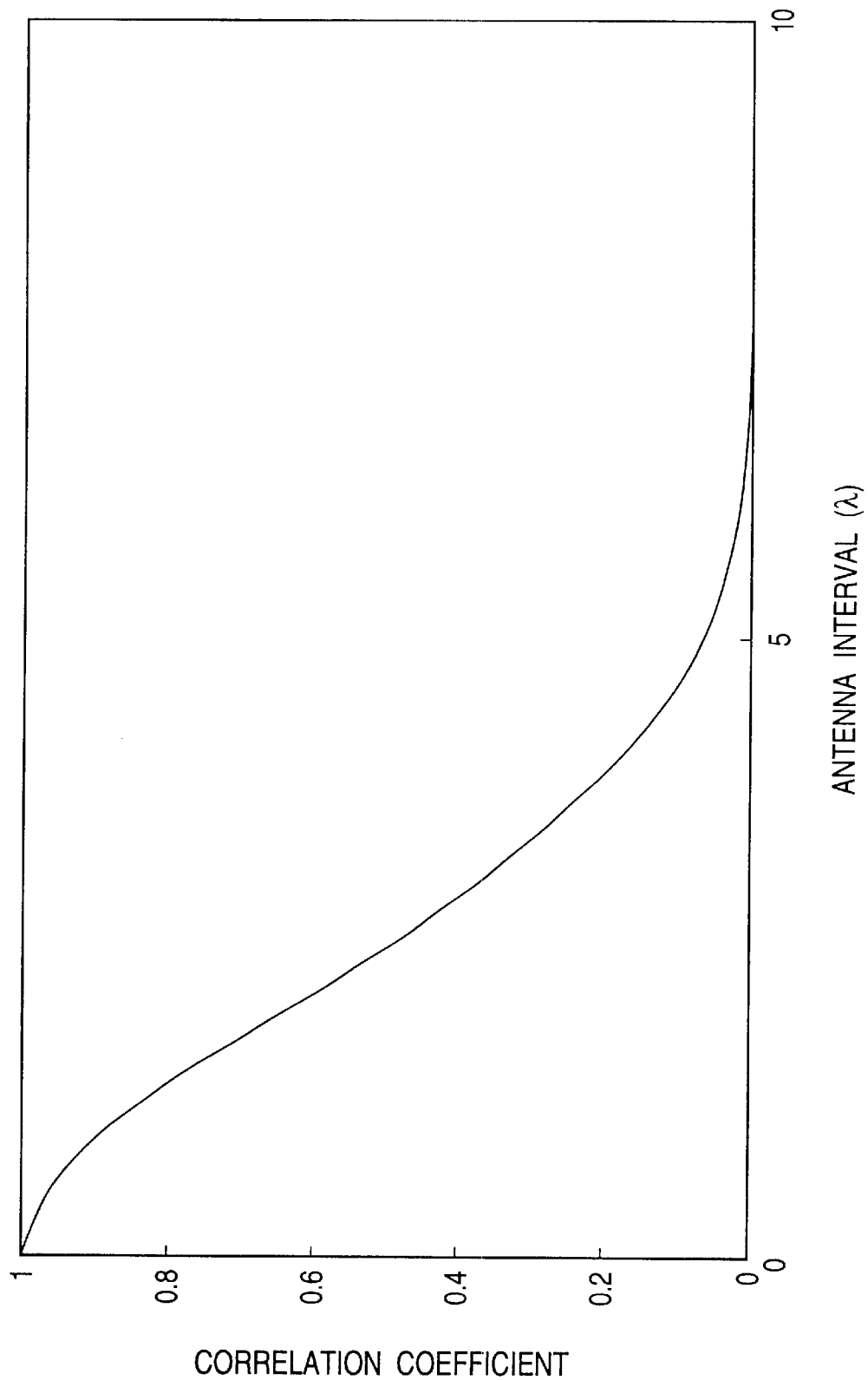
FIG. 10 is a graph showing a relationship between intervals among antenna elements and a correlation coefficient of a conventional antenna selection diversity device.
Figure 11:
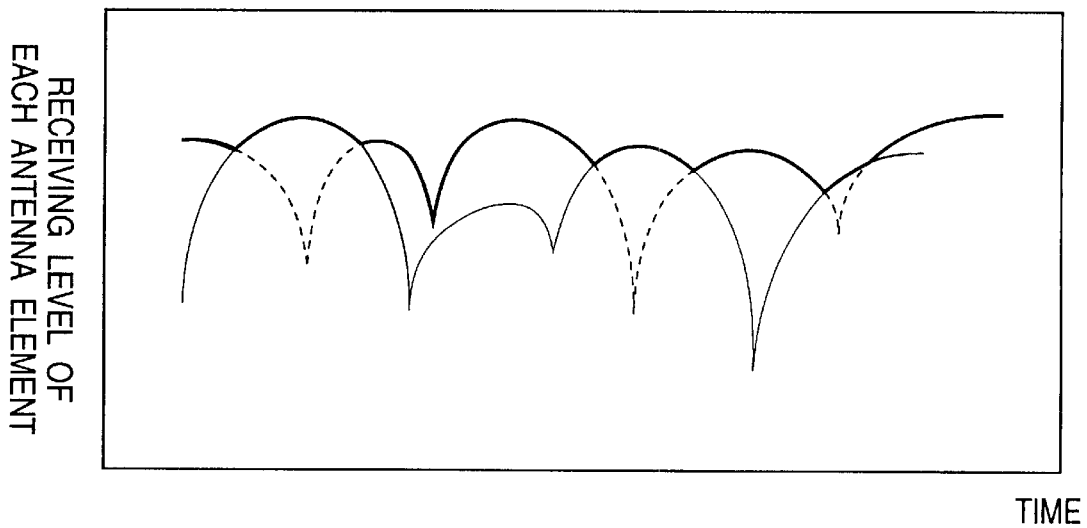
FIG. 11 is a plot showing the state of selection of the antenna element of the antenna selection diversity device.
Figure 12:
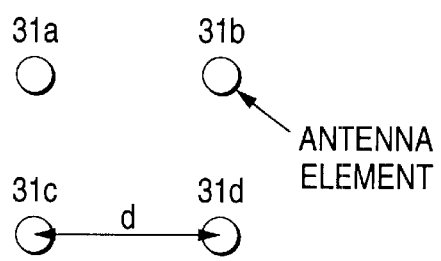
FIG. 12 is a schematic representation showing an example of layout of four antenna elements.

FIGS. 6 and 7 are graphs showing computational simulation results of the antenna gain (i.e., power gain) and an improvement in CNR (Carrier-to-Noise Ratio, i.e. a diversity gain) of a slave station with regard to a conventional space diversity system having four antenna elements 31a to 32d arranged at intervals of "d"<$\lambda$/2 and with regard to the maximum-ratio synthetic transmission diversity device according to the present invention having the antenna elements arranged at intervals "d">$\lambda$/2.

As is obvious from FIG. 7, provided that the antenna elements are arranged at intervals greater than $\lambda$/2 in the manner analogous to that employed in the embodiment and that a transmission signal whose phase and power are optimum for transmission is sent via each of the antenna elements, there is obtained an antenna gain of about 6 dB. In contrast, in the case of the conventional space diversity system shown in FIG. 6, the antenna gain is 3 dB on average. Therefore, it can be understood that the present invention enables an improvement of about 3 dB in the antenna gain. Further, if an attempt is made to reduce the antenna gain to substantially the same as that of the conventional space diversity antenna, power can be saved in an amount of about 3 dB.

As apparent form FIGS. 6 and 7, improvement of CNR (a diversity gain) in a mobile station (slave station) is about 10.44 dB in average in the conventional device, while the same is about 13.62 dB in average in the present invention.

According to the invention, the CNR is improved about 3 dB as the antenna gain.

The maximum-ratio synthetic transmission diversity device according to the present invention is suitable for mobile communication, particularly for a PHS (personal handy-phone system) base station in which the base station communicates with a mobile station through use of the same frequency according to a TDD method.

Figure 13:
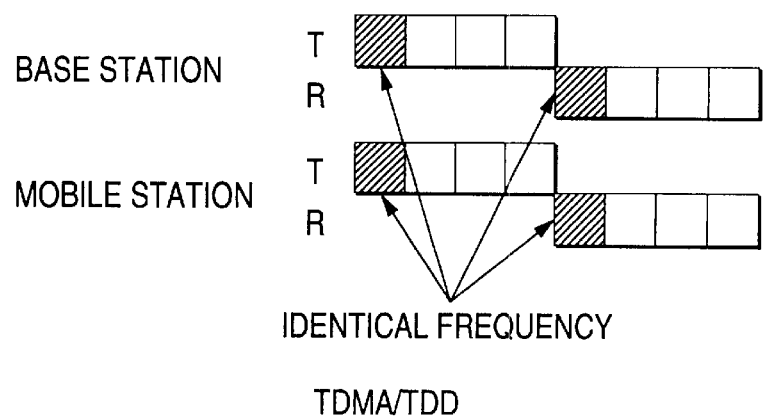
FIG. 13 is a schematic representation showing timing at which slots are transmitted or received between a base station and a mobile station of a PHS according to the TDMA/TDD method.

The PHS system employs a TDMA/TDD method (Time Division Multiple Access/Time Division Duplex) which is shown in FIG. 13 and represents timing at which slots are exchanged between the base station and the mobile station. In short, communications are established between the base station and the mobile station through use of the same frequency by shifting a transmission time (or receiving time). Since the same frequency is used for both the base and mobile stations, the phase and power of a transmission signal can be readily acquired on the basis of information regarding the phase and power of the received signal. Accordingly, the present invention is suitable for the TDD method.

As has been described above, according to the present invention, a transmission diversity device comprises a plurality of antenna elements at intervals greater than $\lambda$/2, and hence the device has both the characteristics: that is, the antenna gain stemming from phase synthesis which characterizes the array antenna, and the space diversity gain of the antenna selection diversity device. Particularly, the present invention can provide a maximum-ratio synthetic transmission diversity device optimum particularly for use with a PHS base station.

What is claimed is:

1. A base station for a communications system of the Time Division Multiple Access/Time Division Duplex type for transmitting and receiving on a specified wavelength, comprising:

a plurality of land-based antenna elements, all of which are spaced from each other at intervals greater than half of said specified wavelength;

a plurality of antenna couplers, each connected to one of said antenna elements;

a digital signal processor;

a plurality of analog to digital converters each connected to receive an analog input from of said receivers and also connected to provide a digital output to said signal processor; and a plurality of digital to analog converters, each connected to receive a digital signal from said signal processor and each also connected to provide an analog signal output to one of said transmitters;

wherein a transmission signal to be transmitted from each of said antenna elements has a power level corresponding to the power level of the signal received by said each antenna element, wherein said transmission signal to be transmitted from said each antenna element has a phase corresponding to the phase of the signal received by said each antenna element, and wherein transmission signals transmitted from said plurality of antenna elements generate an omni-directional radiation pattern.

2. The base station of claim 1 wherein each of said antenna elements is spaced approximately 4 or more wavelengths from all other antenna elements.

3. The base station of claim 1 wherein each of said antenna elements is spaced approximately 2.5 or more wavelengths from all other antenna elements.

4. The base station according to claim 1, wherein said signal processor is arranged to compute said phase of said transmission signal based on phase information from said antenna elements via said analog to digital converters and provide said computed phase to each of said antenna elements via said digital to analog converters.

5. A maximum-ratio synthetic diversity device comprising:

a plurality of antenna elements transmitting and receiving at a specified wavelength, said antenna elements being spaced from each other at intervals greater than one half of said specified wavelength; and a signal processor which detects the phase and the power of the signal received by each of said antenna elements and generates a transmission signal to be transmitted by each of said antenna elements, wherein a transmission signal to be transmitted from each of said antenna elements has a power level corresponding to a power level of the signal received by said each antenna element, wherein said transmission signal to be transmitted from said each antenna element has a phase corresponding to a phase of the signal received by said each antenna element, and wherein transmission signals transmitted from said plurality of antenna elements generate an omni-directional radiation pattern.

6. The diversity device of claim 5 wherein said antenna elements are spaced at intervals greater than said specified wavelength.

7. The diversity device of claim 5 wherein said intervals are approximately 4–5 of said wavelengths.

8. The diversity device of claim 5 further comprising a plurality of receivers, each associated with one of said antenna elements and a plurality of transmitters, each associated with one of said antenna elements.

9. The diversity device of claim 8 wherein said signal processor is a digital circuit comprising a plurality of analog to digital converters, each connecting one of said receivers to said signal processor, and a plurality of digital to analog converters, each connecting one of said transmitters to said signal processor.

10. The diversity device of claim 8 further comprising a plurality of antenna couplers, each of said antenna couplers being connected to one of said antenna elements and said element's associated transmitter and receiver.

11. The diversity device of claim 10 wherein each of said antenna couplers is a multiplexer.

12. The diversity device of claim 10 wherein each of said antenna couplers is an electrically controlled switching device.

13. A cellular communication system comprising the diversity device of claim 10 and further comprising at least one two-way mobile communication unit capable of receiving signals on the wavelength transmitted by said transmitters and capable of transmitting signals on the wavelength received by said receivers.

14. The diversity device of claim 5 wherein transmissions are of the Time Division Duplex type.

15. The diversity device of claim 5, wherein transmissions are of the Time Division Multiple Access type.

16. The diversity device of claim 5, wherein each of said antenna elements is spaced approximately 2.5 or more wavelengths from all other antenna elements.

* * * * *